United States Patent
Lodde et al.

(10) Patent No.: US 9,611,408 B2
(45) Date of Patent: Apr. 4, 2017

(54) TRANSVERSELY TEARABLE FABRIC-ADHESIVE TAPE WITH HIGH ABRASION RESISTANCE

(75) Inventors: Christoph Lodde, Holzwickede (DE); Gülay Wittig, Bochum (DE)

(73) Assignee: Coroplast Fritz Muller GmbH & Co. KG, Wuppertal (DE)

( * ) Notice: Subject to any disclaimer, the term of this patent is extended or adjusted under 35 U.S.C. 154(b) by 335 days.

(21) Appl. No.: 12/941,286

(22) Filed: Nov. 8, 2010

(65) Prior Publication Data
US 2011/0111665 A1    May 12, 2011

Related U.S. Application Data

(60) Provisional application No. 61/259,788, filed on Nov. 10, 2009.

(30) Foreign Application Priority Data

Nov. 9, 2009 (EP) .................................... 09175415

(51) Int. Cl.
*C09J 7/04* (2006.01)

(52) U.S. Cl.
CPC .......... *C09J 7/04* (2013.01); *C09J 2203/302* (2013.01); *C09J 2400/263* (2013.01);
(Continued)

(58) Field of Classification Search
CPC ............ C09J 7/04; D03D 15/00; D03D 3/005
USPC ................... 428/105, 107, 111, 198
See application file for complete search history.

(56) References Cited

U.S. PATENT DOCUMENTS 4,308,313 A * 12/1981 Groff .............................. 442/117
5,108,815 A * 4/1992 Adams et al. ................ 428/172
(Continued)

FOREIGN PATENT DOCUMENTS

| EP | 1 074 595 | 2/2001 |
| EP | 1 911 633 | 4/2008 |

(Continued)

OTHER PUBLICATIONS

Lord, Peter R. Handbook of Yarn Technology : Science, Technology and Economics. n.p.: Woodhead, 2003. eBook Collection (EBSCOhost), EBSCOhost (accessed Oct. 9, 2012).*
(Continued)

*Primary Examiner* — Chinessa Adkins
(74) *Attorney, Agent, or Firm* — Brinks Gilson & Lione

(57) ABSTRACT

The present disclosure relates to a woven-fabric adhesive tape, more particularly a cable-wrapping tape, comprising a tape-shaped woven-fabric backing having at least one adhesive coating applied to at least one side of the backing. The woven-fabric backing is formed from warp threads and weft threads and the linear density of the weft threads in dtex is greater than the linear density of the warp threads in dtex. The width-based linear density of the warp threads in dtex/cm is less than the length-based linear density of the weft threads in dtex/cm. The width-based linear density of the warp threads is about 2000 to 4000 dtex/cm and the length-based linear density of the weft threads is about 8000 to 20 000 dtex/cm, preferably 8000 to 16 000 dtex/cm. The disclosure further provides a tape-shaped woven-fabric backing for use in a woven-fabric adhesive tape.

27 Claims, 1 Drawing Sheet

(52) U.S. Cl.
CPC .... *C09J 2467/006* (2013.01); *C09J 2477/006* (2013.01); *Y10T 442/3301* (2015.04); *Y10T 442/3317* (2015.04)

(56) References Cited

U.S. PATENT DOCUMENTS

| | | | |
|---|---|---|---|
| 5,421,377 A * | 6/1995 | Bonigk | 139/426 R |
| 5,698,477 A | 12/1997 | Iwamaru et al. | |
| 6,790,505 B1 * | 9/2004 | Goux et al. | 428/114 |
| 2002/0106957 A1 * | 8/2002 | Ritter | 442/208 |
| 2009/0029617 A1 * | 1/2009 | Akimori et al. | 442/208 |
| 2009/0101269 A1 * | 4/2009 | Pfaff et al. | 156/60 |
| 2010/0048074 A1 * | 2/2010 | Wahlers-Shcmidlin et al. | 442/60 |

FOREIGN PATENT DOCUMENTS

| | | |
|---|---|---|
| EP | 1 990 393 | 11/2008 |
| EP | 2 050 803 | 4/2009 |
| EP | 2050802 A1 * | 4/2009 |
| GB | 2183263 A * | 6/1987 |
| JP | 7-331200 | 12/1995 |
| JP | 2000-178521 | 6/2000 |
| JP | 2005-54288 | 3/2005 |
| WO | WO 2009043903 A1 * | 4/2009 |

OTHER PUBLICATIONS

EP 2050802 A1 Translation.*

* cited by examiner

TRANSVERSELY TEARABLE FABRIC-ADHESIVE TAPE WITH HIGH ABRASION RESISTANCE

The present patent application claims priority to European Patent Application No. 09175415.0, filed Nov. 9, 2009, as well as to the benefit of the filing date under 35 U.S.C. §119(e) of Provisional U.S. Patent Application No. 61/259,788, filed Nov. 10, 2009. Both of the foregoing applications are hereby incorporated by reference.

FIELD

This disclosure relates generally to a woven-fabric adhesive tape, more particularly to cable-wrapping tape comprising a tape-shaped woven-fabric backing having an at least one-sided adhesive coating.

BACKGROUND

An adhesive tape is disclosed in European Patent No. 1 074 595 B1 in which the number of warp threads per cm is 30 to 50, width-based linear density is less than 2500 dtex/cm and number of weft threads is 18 to 27. The warp threads in this adhesive tape are fixed by the adhesive coating relative to the weft threads, and hence the breaking strength in the transverse direction is less than 10 N. Such an adhesive tape does have sufficient transverse tearability by hand. Such adhesive tape also has the disadvantage that, owing to a low sett for the woven fabric, the weft threads tend to slip, which is why the warp threads and the weft threads have to be fixed relative to each other by the adhesive coating, causing the flexibility to suffer. Furthermore, only an inferior abrasion resistance is ensured, viz., equivalent to LV 312 abrasion class A or B. LV 312 (current version: LV 312-1), which is entitled: Adhesive Tapes for Cable Sets in Automobiles", is a testing directive consolidated by the firms Audi AG, BMW AG, DaimlerChrysler AG, and Volkswagen AG. Not only the abrasion resistance, but also other parameters like flagging, dielectric strength, and transverse tearability are determined in accordance with this directive. LV 312 abrasion classes are defined according to Table 1.

TABLE 1

| Abrasion Class | Requirement on 5 mm Mandrel |
| --- | --- |
| A - no abrasion resistance | <100 strokes |
| B - low abrasion resistance | 100-499 strokes |
| C - medium abrasion resistance | 500-999 strokes |
| D - high abrasion resistance | 1000-4999 strokes |
| E - very high abrasion resistance | ≥5000-14 999 strokes |
| F - extremely high abrasion resistance | ≥15 000 strokes |

European Patent Publication No. 1 990 393 A1 discloses an adhesive tape consisting of a woven-fabric backing wherein the number of warp threads is 30 to 50, the width-based linear density of the warp threads is 2950 dtex/cm, and the linear density of the weft threads per unit length of the tape is 5200 dtex/cm. This tape requires additional fixation of the warp and weft threads relative to each other. Such an adhesive tape is likewise readily hand-tearable, but has only a low abrasion resistance, viz., LV 312 class A.

Accordingly, there exists a desire to provide an improved woven-fabric adhesive tape such that it exhibits good compound strength without additional fixation measures for the warp and weft threads and hence good manual tearability and also with an abrasion resistance corresponding to LV 312 classes C or D.

SUMMARY

In satisfying the above need, as well as overcoming the enumerated drawbacks and other limitations of the related art, the present disclosure provides a woven-fabric adhesive tape, more particularly a cable-wrapping tape, comprising a tape-shaped woven-fabric backing having at least one adhesive coating applied to at least one side of the woven-fabric backing. The woven-fabric backing is formed from warp threads and weft threads with the linear density of the weft threads in dtex being greater than the linear density of the warp threads in dtex and the width-based linear density of the warp threads in dtex/cm being less than the length-based linear density of the weft threads in dtex/cm.

According to one aspect of the present disclosure an improved adhesive tape of the type described above is disclosed that exhibits good compound strength without additional fixation measures for the warp and weft threads and hence good manual tearability. Such tape also exhibits an abrasion resistance corresponding to LV 312 classes C or D. The width-based linear density of the warp threads in the adhesive tape is about 2,000 to 4,000 dtex/cm and the length-based linear density of the weft threads is about 8,000 to 20,000 dtex/cm, preferably about 8000 to 16,000 dtex/cm, and/or the linear density of the weft threads is greater than 400 dtex, more particularly about 550 dtex.

According to another aspect of the present disclosure, the woven backing fabric is provided with sufficient integrity to ensure good manual tearability, i.e., in the direction of the weft threads. The predetermined length-based linear density of the weft threads and the predetermined linear density of the weft threads each amount to at least about four times the predetermined width-based linear density of the warp threads and the predetermined linear density of the warp threads, respectively. At the same time, the predetermined linear strength of the weft threads achieves an abrasion resistance corresponding to LV 312 class C or greater, more particularly class D.

Advantageously, the warp and weft threads may be comprised of a polyester (PET), and hence the woven fabric is resistant to rotting. Alternatively, it is also possible to use weft threads comprised of a polyamide (PA).

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
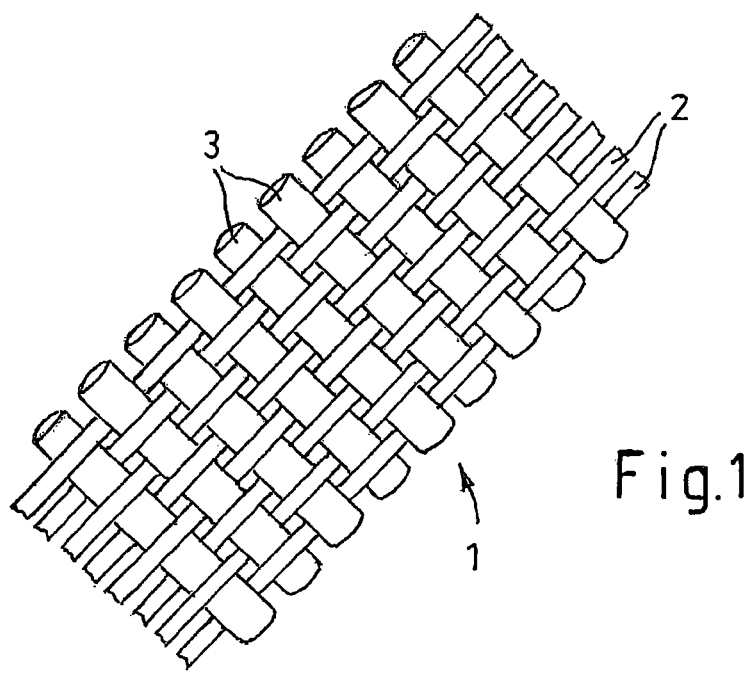
FIG. 1 is a schematic representation of the basic construction for a woven-fabric backing prepared according to the teachings of the present disclosure.

The following description is merely exemplary in nature and is in no way intended to limit the present disclosure or its application or uses. It should be understood that throughout the description and drawings, corresponding reference numerals indicate like or corresponding parts and features.

The present disclosure generally provides a woven-fabric adhesive tape, more particularly a cable-wrapping tape, comprising a tape-shaped woven-fabric backing having at least one adhesive coating applied to at least one side of the woven-fabric backing. The woven-fabric backing is formed from warp threads and weft threads with the linear density of the weft threads in dtex being greater than the linear density of the warp threads in dtex and the width-based linear density of the warp threads in dtex/cm being less than the length-based linear density of the weft threads in dtex/cm.

Referring to FIG. 1, a woven-fabric backing 1 according to one aspect of the present disclosure, may be tape-shaped, i.e., its length is greater than its width, and comprised of a woven fabric formed of warp threads 2 extending in the tape's longitudinal direction and also weft threads 3 extending transversely to the warp threads 2, more particularly extending perpendicularly to the warp threads 2. The length-based linear density of the weft threads 3 in dtex/cm is four to five times the width-based linear density of the warp threads 2 in dtex/cm, such that the width-based linear density of the warp threads 2 is about 2,000 to 4,000 dtex/cm and the length-based linear density of the weft threads 3 is about 8,000 to 20,000 dtex/cm, preferably about 8000 to 16,000 dtex/cm. The linear density of the weft threads 3 is greater than 400 dtex, more particularly greater than or equal to 550 dtex. The linear density of the warp threads 2 is not less than 50 dtex, more particularly not less than 55 dtex with not less than 84 dtex being especially preferred. The woven fabric in question may comprise a commonplace woven fabric material.

The woven-fabric backing 1 prepared according to the teachings of the present disclosure can advantageously be in an already washed, heatset, or set and calendered state. The disclosure provides that the warp threads 2 and weft threads 3 can be formed as monofil yarns or alternatively as so-called filament yarn, in which case multiple fibers have been spun together and form the individual warp or weft thread 2, 3. The warp and weft threads 2, 3 of the present disclosure can have improved textile properties as a result of having been subjected to a fiber-specific upgrading operation known as texturing. In texturing, the originally flat filaments are subjected to mechanical-thermal, chemical-thermal, or other mechanical processes that exploit the thermoplastic properties of the filaments to endow them with greater volume, higher elasticity and extensibility, increased bulk and/or enhanced heat-retaining ability through higher air inclusion, a high permeability to air, and a higher moisture-imbibing ability through distribution of the water droplets in the crimp arcs of the textured fibers.

Advantageously, the warp and/or weft threads 2, 3 when used according to the present disclosure are formed from filament yarns further processed by intermingling. In intermingling, the filament yarns are given an additional twist (also known as producer twist) to protect the individual filament against damage and to stop already broken filaments from forming fuzzballs. The intermingling process is an air entanglement process wherein the filament yarn is entangled with compressed air in the course of moving through a nozzle. The warp and weft threads 2, 3 of the present disclosure preferably consist of polyester, but other synthetic manufactured fibers can be used as well. The number of weft threads 3 per centimeter of tape length is about 16 to 32, more particularly about 20 to 24, while the number of warp threads 2 per centimeter of tape width is about 27 to 60, more particularly about 35 to 48.

Figure 2:
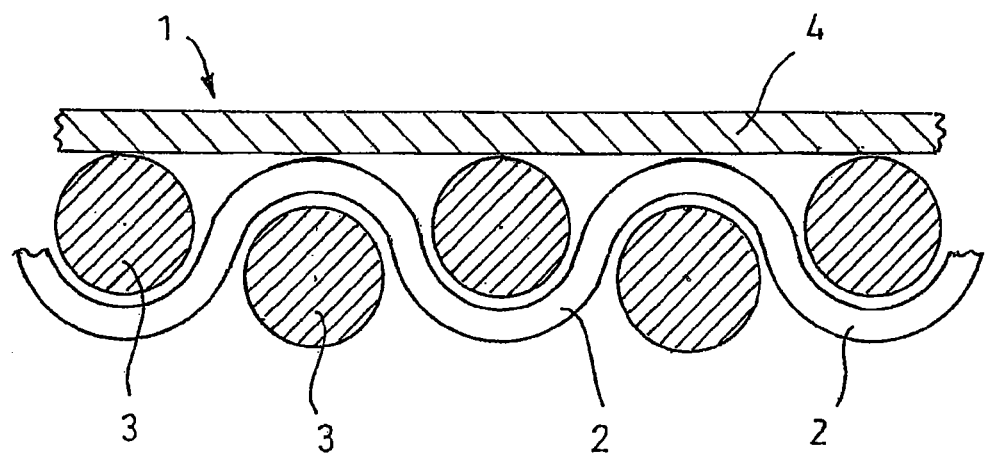
FIG. 2 is a schematic representation of a section of adhesive tape according to one aspect of the present disclosure that incorporates the woven-fabric backing of FIG. 1.

Referring now to FIG. 2, a section through an adhesive tape prepared according to one aspect of the present disclosure is provided showing that the textile woven-fabric backing 1 may have an adhesive coating 4 applied to it surficially, i.e., to a low depth of penetration into the woven-fabric backing 1. An acrylate adhesive is preferable for use as the adhesive coating. However, one skilled-in-the-art will understand that the use of other adhesives as the adhesive coating is within the scope of the present disclosure. The weight of adhesive in the adhesive coating is advantageously 75 to 80 g/m$^2$.

Table 2 below illustrates several exemplary embodiments, among all embodiments, for the adhesive tape of the present disclosure. The adhesive tape of the present disclosure is shown on the one hand to have a high LV 312 abrasion resistance, viz., essentially a class D abrasion resistance, and also a low breaking extension and break force, which ensures good manual tearability. The thickness of an adhesive tape of the present disclosure is between 0.25 to 0.30 mm, more particularly 0.25 to 0.27 mm, inclusive of the applied adhesive coating 4. In principle, the weft thread 3 can be applied as a single yarn (see Example 1 of Table 2 below) or in combination with multiple yarns. As is more particularly evident from the embodiments according to Examples 4 and 5, it is within the present disclosure to form the weft threads 3 from multiple single yarns of differing linear density. For example, the weft threads 3 according to Example 4 can comprise two single yarns, viz., a single yarn having a linear density of 220 dtex and a single yarn having a linear density of 330 dtex, resulting in an overall linear density of 550 dtex. In operative Example 5, the weft threads 3 are formed from three single yarns, one single yarn having a nominal linear density of 220 dtex and the other two single yarns each having a nominal linear density of 167 dtex, resulting in an overall linear density of 550 dtex (nominal weft-thread linear density).

The backing weight and the weight of the adhesive are measured according to DIN EN 2286, the thickness according to DIN EN 1942; the breaking extension and the break force according to DIN EN 14410; and the flagging, the abrasion resistance, and the transverse tearability according to LV 312-1.

TABLE 2

|  | Unit | Example 1 | Example 2 | Example 3 | Example 4 | Example 5 | Example 6 | Example 7 | Example 8 | Example 9 |
| --- | --- | --- | --- | --- | --- | --- | --- | --- | --- | --- |
| Backing weight | g/m$^2$ | 150 | 140 | 130 | 150 | 150 | 140 | 140 | 140 | 140 |
| Adhesive | — | acrylate | acrylate | acrylate | acrylate | acrylate | acrylate | acrylate | acrylate | acrylate |
| Weight of adhesive | g/m$^2$ | 75-80 | 75-80 | 75-80 | 75-80 | 75-80 | 75-80 | 75-80 | 75-80 | 75-80 |
| Number of warp threads | 1/cm | 48 | 45 | 39 | 48 | 48 | 35 | 27 | 48 | 35 |

TABLE 2-continued

| | Unit | Example 1 | Example 2 | Example 3 | Example 4 | Example 5 | Example 6 | Example 7 | Example 8 | Example 9 |
|---|---|---|---|---|---|---|---|---|---|---|
| Number of weft threads | 1/cm | 20 | 22 | 24 | 20 | 20 | 20 | 20 | 20 | 20 |
| Yarn type warp | material | PET | PET | PET | PET | PET | PET | PET | PET | PET |
| Linear density of warp threads | dtex | 55 | 55 | 55 | 55 | 55 | 84 | 84 | 55 | 84 |
| Yarn type weft | material | PET | PET | PET | PET | PET | PET | PET | PA | PA |
| Linear density of weft threads | dtex | 550 | 550 | 440 | 220 dtex + 330 dtex or 550 dtex | 220 dtex + (2 × 167 dtex) or 550 dtex | 550 | 220 dtex + (2 × 167 dtex) or 550 dtex | 470 | 235 dtex + (2 × 167 dtex) or 570 dtex |
| Width-based warp-thread linear density | dtex/cm | 2700 | 2475 | 2145 | 2700 | 2700 | 2940 | 2270 | 2700 | 2940 |
| Length-based weft-thread linear density | dtex/cm | 11 000 | 12 100 | 10 560 | 11 000 | 11 000 | 11 000 | 11 000 | 9400 | 11 380 |
| Thickness | mm | 0.25-0.27 | 0.26-0.27 | 0.22-0.24 | 0.25-0.27 | 0.25-0.27 | 0.25-0.27 | 0.25-0.27 | 0.25-0.27 | 0.25-0.27 |
| Breaking extension | % | 28-30 | 28-30 | 20-30 | 28-30 | 28-30 | 28-30 | 28-30 | 28-30 | 28-30 |
| Break force | N/cm | 70-100 | 70-100 | 50-60 | 70-100 | 70-100 | 70-100 | 70-100 | 70-100 | 70-100 |
| Flagging (30 min) | mm | ok | ok | ok | ok | ok | ok | ok | ok | ok |
| Flagging (24 h) | mm | ok | ok | ok | ok | ok | ok | ok | ok | ok |
| Abrasion with 5 mm mandrel to LV 312 | strokes | 1000-2000 (class D) | 1000-2000 (class D) | 300-500 (class B/C) | 1000-2000 (class D) | 1000-2000 (class D) | 1000-2000 (class D) | 1000-2000 (class D) | 1500-3500 (class D) | 1500-3500 (class D) |
| Transverse tearability to LV 312 | ./. | yes | yes | yes | yes | yes | yes | yes | yes | yes |

Table 3 below describes two commercially available woven-fabric adhesive tapes for comparison with the woven-fabric adhesive tapes of the present disclosure as shown in Table 2. More specifically, Table 3 illustrates that the adhesive tape of EP 1 990 393 A1 has a low abrasion resistance, class B, whereas the adhesive tape of Coroplast™ 837X has a high abrasion resistance, of class D, but is not transversely tearable by hand. The adhesive tapes according to the present disclosure, more particularly according to the Examples of Table 2, by contrast, combine good transverse tearability by hand with a high abrasion resistance, more particularly of class D.

According to another aspect of the present disclosure, the tape also pertains to tape-shaped as previously described above having a woven-fabric backing 1 without an adhesive coating 4.

TABLE 3

| | Unit | Coroplast 839 EP 199 0393 A1 | Coroplast 837 X |
|---|---|---|---|
| Backing weight | g/m² | 115-118 | 130 |
| Adhesive | — | acrylate | acrylate |
| Weight of adhesive | g/m² | 42-48 | 80-100 |
| Number of warp threads | 1/cm | 48 | 45 |
| Number of weft threads | 1/cm | 30 | 25 |
| Linear density of warp threads | dtex | 55 | 167 |
| Linear density of weft threads | dtex | 334 or 167 (2x) | 167 |
| Width-based warp-thread linear density | dtex/cm | 2700 | 7500 |
| Length-based weft-thread linear density | dtex/cm | 10 000 | 4100 |
| Thickness | mm | 0.18-0.21 | 0.24-0.27 |
| Breaking extension | % | 20-50 | 30-60 |
| Break force | N/cm | 65-100 | 210-320 |
| Abrasion with 5 mm mandrel to LV 312 | strokes | 100-499 (class B) | 1000-2000 (class D) |
| Transverse tearability | ./. | yes | no |

The adhesive tape of the present disclosure has an abrasion resistance relevant to classes C and D of LV 312, good conformability, and good flagging characteristics, as shown in Table 2. In another aspect of the present disclosure, the woven-fabric backing owing to an optional calendering and consolidating of the woven-fabric backing 1, has a dielectric strength of greater than 1000 volts. The dielectric strength is determined according to LV 312-1. For determining the dielectric strength, a single-wire FLRY-cable with a cross section area of 0.5 mm² and with a length of circa 50 cm is preferably used. In the middle of the cable, the isolation is removed over a length of 20 mm. The free section is isolated by applying three isolating layers of the adhesive tape to be tested. Thereby, the adhesive tape has a width of about 50 mm. An aluminum foil is placed over the adhesive tape. The test specimen is contacted, and a voltage of 1 kV (50-60 Hz) applied. Subsequently the voltage is increased with a rate of 500 V/s until dielectric breakdown occurs.

Since by virtue of the woven-fabric backing 1 being formed according to the present disclosure, the woven-fabric backing 1 has sufficient stability and the adhesive coating 4 can be applied in a nozzle process or else in a curtain coating process. It is not a requirement according to the present disclosure that the layer of adhesive penetrate deeply into the woven-fabric backing 1 to fix the warp and weft threads 2, 3 together when they cross each other at their crossing points. On the contrary, it is a feature of the present disclosure that, owing to the method of application chosen, the adhesive coating 4 shall essentially rest only surficially on the warp threads 2 and the weft threads 3, hence the adhesive material has only a low depth of penetration into the yarn material or into the woven-fabric backing 1. Optionally, the woven-fabric backing 1 may be given a final seal through the application of an acrylate topcoat. In addition, a percent breaking extension of 28 to 30 results in good manual tearability in that a break force on the order of 70 to 100 N/cm does not need to be exceeded.

A person skilled in the art will recognize that the measurements described are standard measurements that can be obtained by a variety of different test methods. The test methods described in the examples represents only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A woven-fabric adhesive tape for use as a cable-wrapping tape, the woven-fabric adhesive tape consisting of:
    a woven-fabric backing tape consisting of synthetic warp threads and synthetic weft threads; and
    an adhesive coating directly applied to at least one-side of the woven fabric backing tape;
    wherein the linear density of the weft threads is greater than the linear density of the warp threads, and the linear density of the warp threads per tape width is less than the linear density of the weft threads per tape length, such that the linear density of the warp threads per tape width is between 2,000 to 4,000 dtex/cm and the linear density of the weft threads per tape length is between 8,000 and 20,000 dtex/cm, the linear density of the weft threads per tape length amounting to four to ten times the linear density of the warp threads per tape width;
    wherein the warp and weft threads cross one another at crossing points and have sufficient integrity without additional fixation to ensure manual tearability in the direction of the weft threads as measured according to LV 312, and the adhesive coating is formed such that it is only a surface coating and hence the adhesive coating does not fix the warp and weft threads relative to each other at their crossing points.

2. The woven-fabric tape of claim 1, wherein the linear density of the weft threads per tape length is 8000 to 16,000 dtex/cm.

3. The woven-fabric tape according to claim 2, wherein the linear density of the weft threads per tape length is 9000 to 12,100 dtex/cm.

4. The woven-fabric tape according to claim 3, wherein the linear density of the weft threads per tape length is about 11 000 dtex/cm.

5. The woven-fabric tape of claim 1, wherein the weft threads have a linear density that is greater than 400 dtex.

6. The woven-fabric tape according to claim 5, wherein the weft thread is a single yarn.

7. The woven-fabric tape according to claim 5, wherein the weft threads are formed from three to five single yarns which each have a nominal linear density of about 167 dtex.

8. The woven-fabric tape of claim 5, wherein the linear density of the weft threads is at least 550 dtex.

9. The woven-fabric tape according to claim 8, wherein the weft thread is formed from two single yarns, the linear density of one of the single yarns being about 220 dtex and linear density of the other single yarn being about 330 dtex.

10. The woven-fabric tape according to claim 1, wherein the linear density of the warp threads at least 50 dtex.

11. The woven-fabric tape of claim 10, wherein the linear density of the warp threads is at least 55 dtex.

12. The woven-fabric tape of claim 11, wherein the linear density of the warp threads is at least 84 dtex.

13. The woven-fabric tape according to claim 1, wherein the number of weft threads per centimeter of tape length is 16 to 32.

14. The woven-fabric tape according to claim 13, wherein the number of weft threads per centimeter of tape length is 20 to 24.

15. The woven-fabric tape according to claim 1, wherein the number of weft threads per centimeter of tape length is 20 to 24 and the number of warp threads per centimeter of tape width is 27 to 60.

16. The woven-fabric tape according to claim 15, wherein the number of warp threads per centimeter of tape width is 35 to 48.

17. The woven-fabric tape according to claim 1, wherein the woven-fabric backing tape is made of a woven polyester fabric.

18. The woven-fabric tape according to claim 1, wherein the woven-fabric backing tape comprises polyester warp threads and polyamide weft threads.

19. The woven-fabric tape according to claim 1, wherein at least one of the warp or weft threads is comprised of filament yarns.

20. The woven-fabric tape according to claim 19, wherein the filament yarns are formed by yarn intermingling.

21. The woven-fabric tape according to claim 1, wherein at least the warp threads or the weft consist of a textured yarn.

22. The woven-fabric tape according to claim 1, wherein at least one of the warp and weft threads is formed from filament yarns having multiple fibers.

23. The woven-fabric tape according to claim 1, wherein the woven backing tape is made of a fabric that is calendered and consolidated such that it has a dielectric strength of greater than 1000 volts.

24. The woven-fabric tape of claim 1, wherein the woven-fabric backing tape and the adhesive coating provide satisfactory flagging properties according to testing directive LV 312-1.

25. A woven-fabric backing tape for use in a woven-fabric adhesive tape, the woven-fabric backing tape consisting of synthetic warp threads and of synthetic weft threads that cross one another at crossing points and have sufficient integrity without additional fixation to ensure manual tearability in the direction of the weft threads and to achieve an abrasion resistance of Class C or D as measured according to LV 312;

wherein the linear density of the weft threads is greater than the linear density of the warp threads, and the linear density of the warp threads per tape width is less than the linear density of the weft threads per tape length, such that the linear density of the warp threads per tape width is between 2,000 to 4,000 dtex/cm and the linear density of the weft threads per tape length is between 8,000 and 20,000 dtex/cm, the linear density of the weft threads per tape length amounting to four to ten times the linear density of the warp threads per tape width, and wherein the number of weft threads per centimeter of tape length is smaller than the number of warp threads per centimeter of tape width.

26. The woven-fabric backing tape according to claim 25, wherein the weft threads have a linear density that is greater than 400 dtex.

27. The woven-fabric backing tape according to claim 25, wherein the linear density of the warp threads is at least 50 dtex.

\* \* \* \* \*